C. E. FORRY.
STEMMING APPARATUS.
APPLICATION FILED JUNE 12, 1919.

1,365,096.

Patented Jan. 11, 1921.
5 SHEETS—SHEET 1.

WITNESS

INVENTOR
Charles E. Forry
BY
ATTORNEYS

C. E. FORRY.
STEMMING APPARATUS.
APPLICATION FILED JUNE 12, 1919.

1,365,096.

Patented Jan. 11, 1921.
5 SHEETS—SHEET 3.

WITNESS

INVENTOR
Charles E. Forry
BY
ATTORNEYS

C. E. FORRY.
STEMMING APPARATUS.
APPLICATION FILED JUNE 12, 1919.

1,365,096.

Patented Jan. 11, 1921.
5 SHEETS—SHEET 4.

WITNESS

INVENTOR
Charles E. Forry
BY
ATTORNEYS

C. E. FORRY.
STEMMING APPARATUS.
APPLICATION FILED JUNE 12, 1919.

1,365,096.

Patented Jan. 11, 1921.
5 SHEETS—SHEET 5.

WITNESS

Wm F. Drew

INVENTOR
Charles E. Forry
BY
Acker & Totten
ATTORNEYS

UNITED STATES PATENT OFFICE.

CHARLES E. FORRY, OF OAKLAND, CALIFORNIA, ASSIGNOR OF ONE-HALF TO ARTHUR L. DUNCAN, OF OAKLAND, CALIFORNIA.

STEMMING APPARATUS.

1,365,096.   Specification of Letters Patent.   Patented Jan. 11, 1921.

Application filed June 12, 1919. Serial No. 303,656.

*To all whom it may concern:*

Be it known that I, CHARLES E. FORRY, a citizen of the United States, residing at Oakland, in the county of Alameda and State of California, have invented certain new and useful Improvements in Stemming Apparatus, of which the following is a specification.

The present invention relates to a stemming apparatus particularly designed to be employed in removing the stems of cherries or like fruits.

The principal object of the present invention is to provide an apparatus which is capable of being cheaply constructed and for its size is capable of great capacity. A further object is to provide an apparatus which is capable of receiving a continuous feed of fruit to be stemmed and the operation of which agitates the fruit as it passes through the apparatus to position the stems to be acted on by the removing or pulling means.

The invention consists primarily in a rotatable cylinder set at an inclination and being preferably of a polygonal cross sectional configuration, the cylinder being provided with numerous longitudinally extending stem receiving grooves with which coöperate pulling rollers or devices which are intermittently operated, the rotation of the cylinder causing a travel of the fruit therethrough from the high to the low end thereof.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fuly comprehend the invention, reference is directed to the accompanying drawings, wherein—

Figure 1:
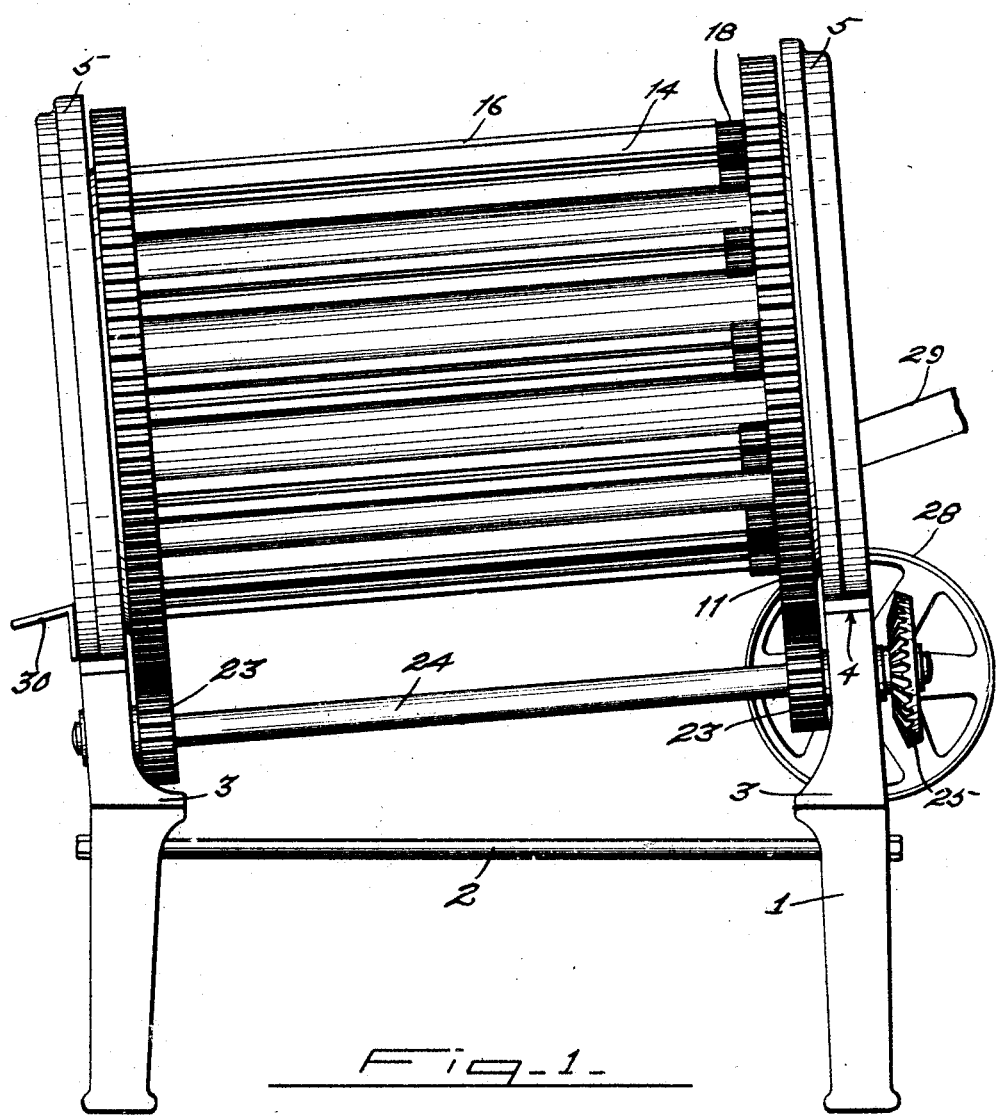
Figure 1 is a view in side elevation of the preferred embodiment of my invention.
Figure 2:
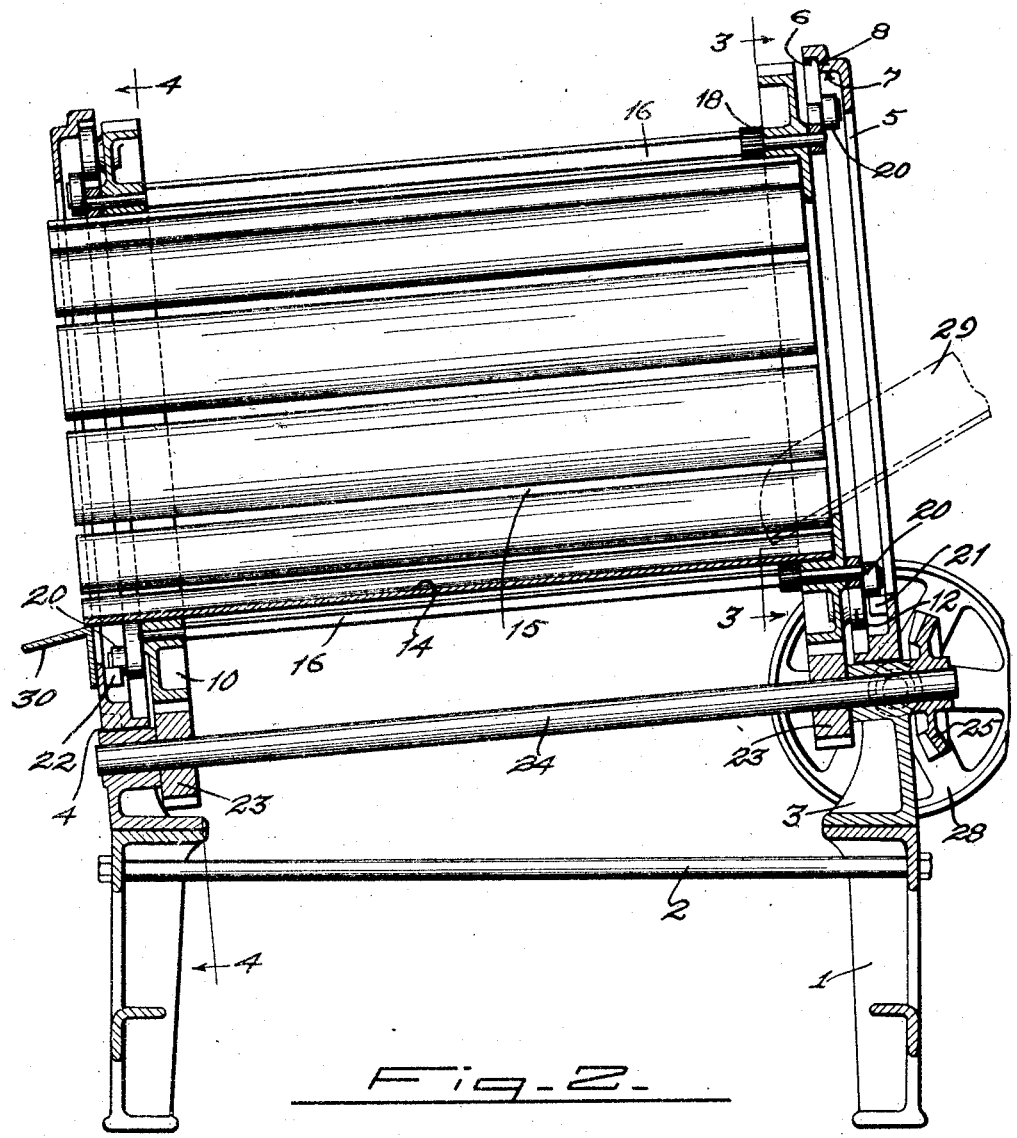
Fig. 2 is a vertical sectional view, taken on line 2—2 of Fig. 4.

Referring more particularly to the several views of the drawings, wherein like characters of reference designate corresponding parts, 1 indicates the end members of a suitable supporting frame or base, said members being connected by a suitable tie rod 2. Resting on said members 1 are the supports 3, one being of greater height than the other, as illustrated in Figs. 1 and 2 of the drawings. The upper surfaces of said members 3 are formed with arcuate depressions 4 in which rest the drum supporting and guide rings 5. Each ring at its inner edge is formed with an annular supporting track 6 and adjacent said track is formed with an annular runway 7 of a diameter less than that of the track 6. The wall 8 between said track 6 and runway 7 is disposed at right angles to said track and runway and provides a surface for precluding longitudinal movement of the cylinder within said supporting rings, as hereinafter described.

Figure 5:
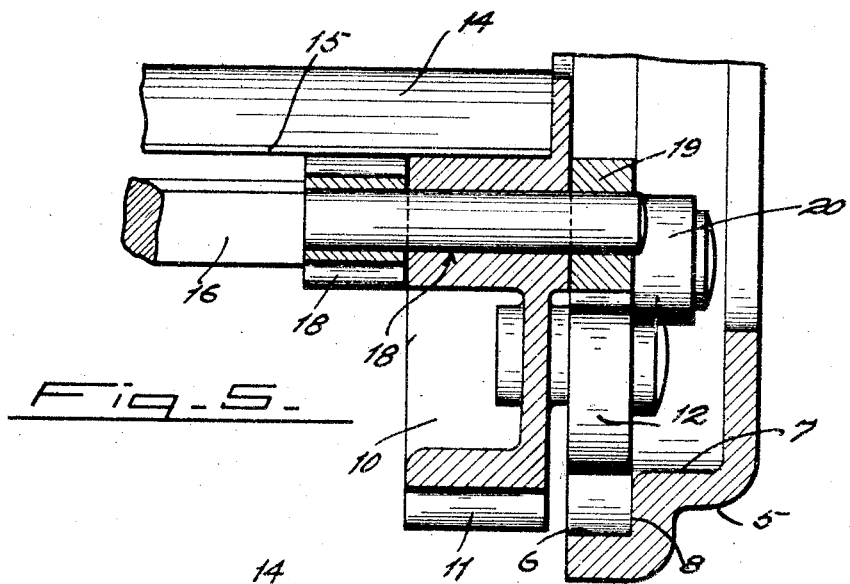
Fig. 5 is a vertical sectional view of the puller operating means taken on line 5—5 of Fig. 6.
Figure 6:
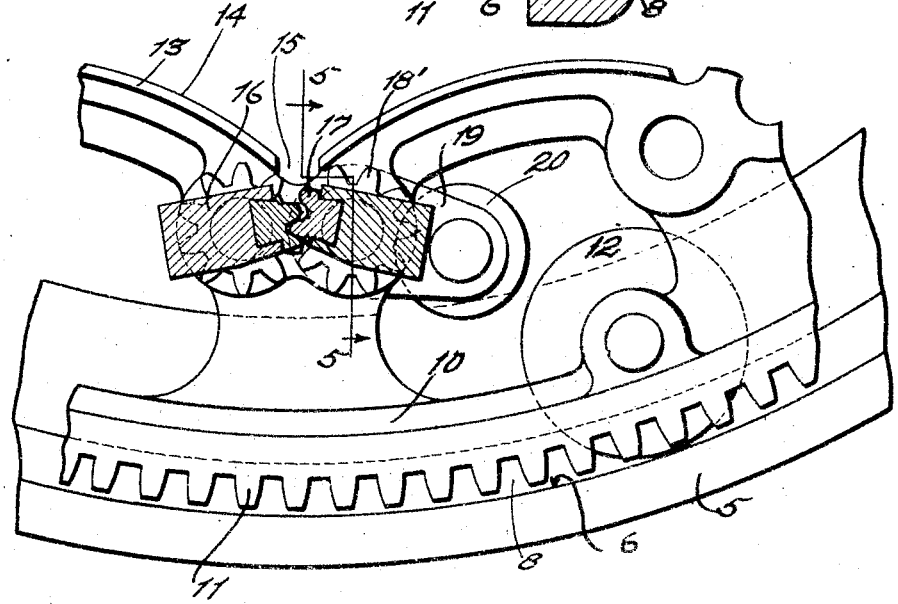
Fig. 6 is a broken transverse sectional view disclosing one set of puller operating means at one end of the drum.

Rotatably mounted at its opposite ends in said rings 5 is an open ended cylinder 9, the same consisting of the end frame members 10, circular in plan, and the peripheral edges of which lie adjacent the tracks 6, as in Figs. 1, 2 and 5 of the drawings, and are formed with the gear teeth 11. The outer faces of said frame members 10 carry the supporting rolls 12, which rest on the tracks 6 of the supporting rings 5, as in Fig. 2 of the drawings, and provide means whereby the cylinder is freely rotatable within said supporting rings 5. The inner surfaces of the frame members 10 are formed with the arcuate plate supporting surfaces 13. On the corresponding surfaces of adjacent frame members rest the opposite ends of the cylinder forming plates 14, the longitudinal side edges of which are in parallel spaced relation, providing a stem receiving slot or opening 15 between each pair of plates 14.

Longitudinally disposed at the outer face of said plates 14 and arranged one at each side of the adjacent longitudinal edges of said plates are the stem removing bars or members 16 rotatably mounted at their opposite ends in bearing openings 18 in the frame members 10. The adjacent edges of said member 16 carry the interengaging or coöperating toothed stem pulling plates 17 between the teeth of which the fruit stems fall when the stems project through the slots 15.

On the rotation of the cylinder, as hereinafter described, a pulling action is imparted to the members 16 by the following mechanism.

Figure 3:
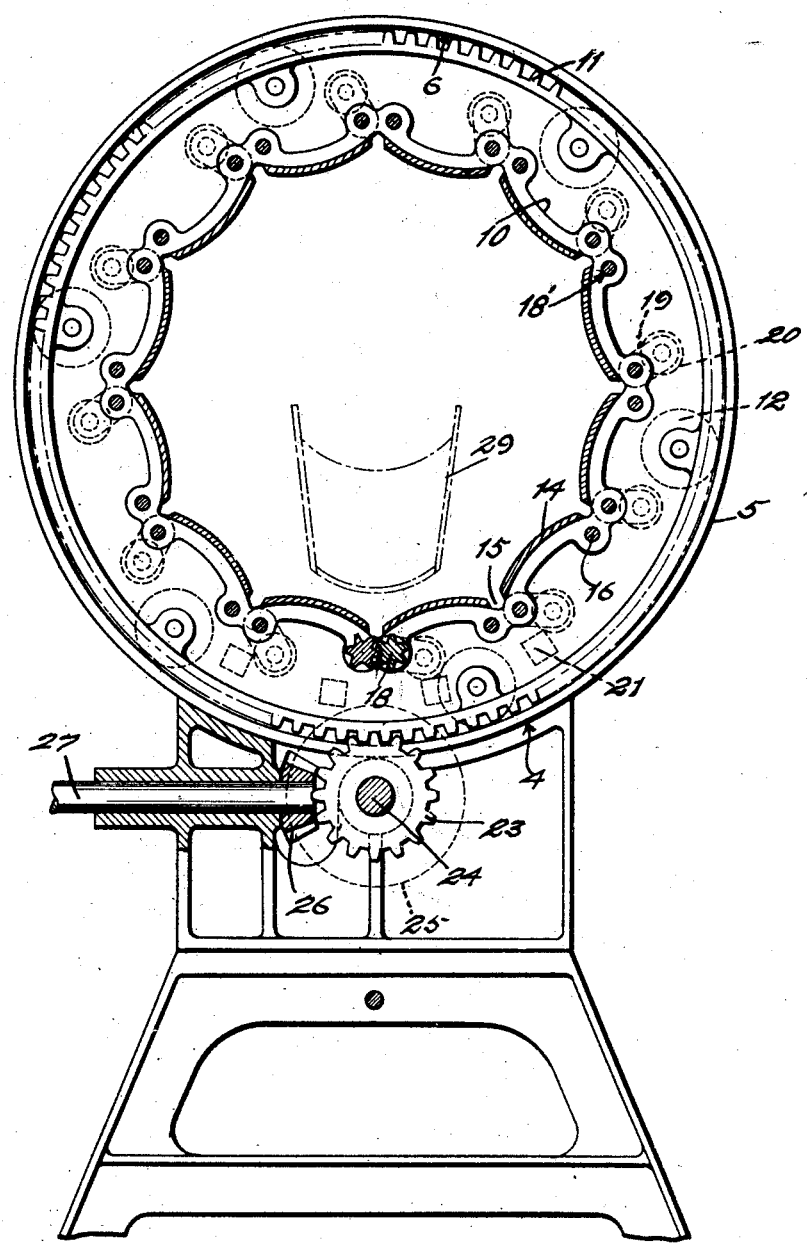
Fig. 3 is a transverse sectional view of the feed end of the apparatus taken on line 3—3 of Fig. 2, viewed in the direction of the arrows.
Figure 4:
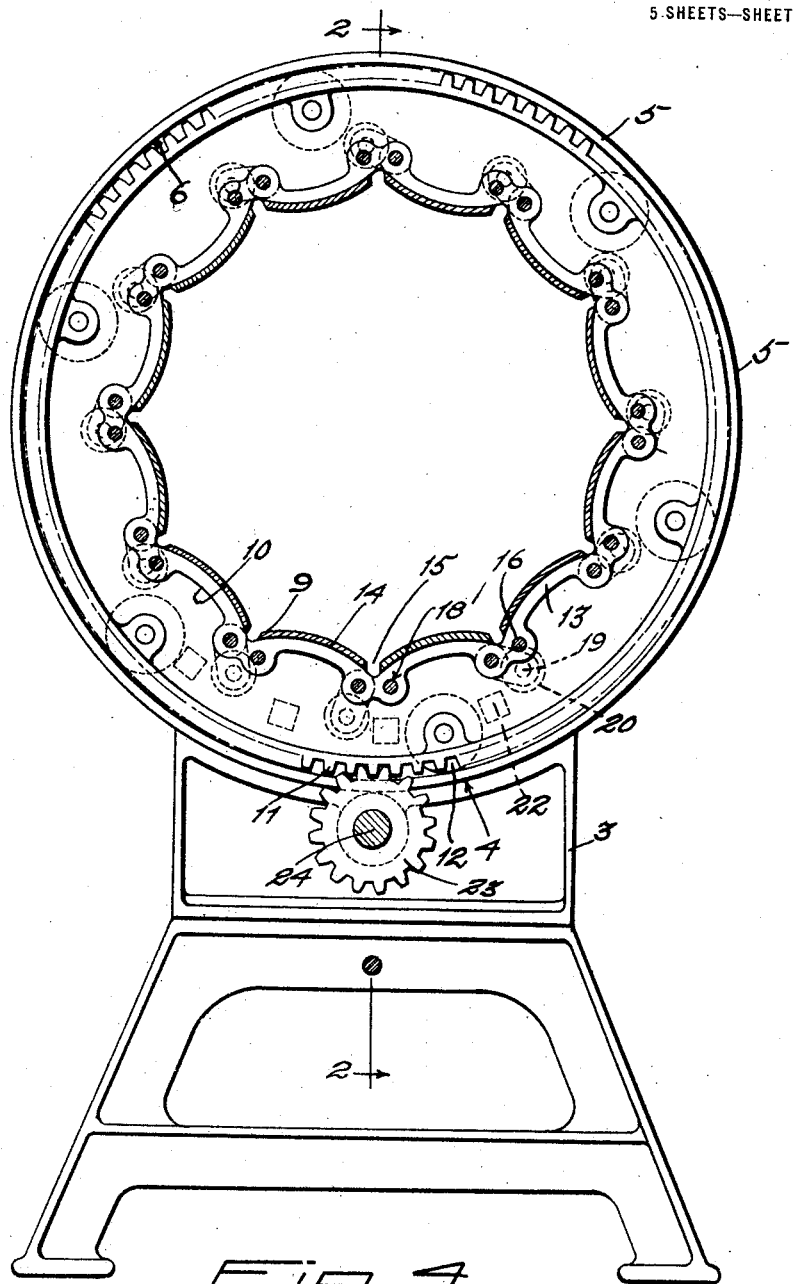
Fig. 4 is a view, similar to Fig. 3, taken on line 4—4 of Fig. 2 and viewed in the direction of the arrows.

The adjacent ends of the corresponding members 16 are interconnected to rotate in unison by the gears 18', and said members 16 at one end each carry an offset crank 19 provided at its free end with a roller 20, the cranks being arranged at opposite ends of adjacent pairs of members 16, as illustrated in Figs. 3 and 4 of the drawings. During the rotation of the cylinder, the roller 20 at one end of any given pair of members 16, contacts with one of the operating lugs 21 on the inner face of its associated ring 5, which causes a partial rotation of said members 16 to move the pulling surfaces 17 in a direction from the inner surfaces of the cylinder 9, which action will pull or remove any stems lying between said surfaces 17 from the fruit which is held between the adjacent longitudinal edges of the coöperating slot 15. On the continued rotation of the cylinder, the roller 20, at the opposite end of said given pair of members 16, rides on the operating lug 22 associated with the ring 5 at the discharge end of the cylinder, which action simultaneously rotates the member 16 in a direction to move the pulling member 17 toward the groove 15, so that any additional stems that might project into said groove during the rolling of the fruit on the plate 14 from the first position will fall between said members 17 and be removed from the fruit on a successive operation of the members 16, as heretofore described.

It will be apparent from the present description that the cylinder during its rotation agitates the fruit contained therein as the same passes circumferentially within the cylinder over the curved plates 14 and that said pulling members are successively opened and closed to pull or disconnect the stems from the fruit as said stems project through the slot 15, this continued operation removing the stems from the fruit as the same rolls longitudinally of the inclined cylinder from its feed toward the discharge end thereof.

Any suitable mechanism may be employed for rotating the cylinder, that form illustrated being suitable pinion gears 23 carried on the opposite ends of a rotatable shaft 24, mounted in bearings 25 in the opposite supporting members 3, the shaft carrying on one end a beveled gear 25 which is engaged by a driving pinion 26 on the end of a rotatable shaft 27, which carries on its outer end a band wheel 28 operated from any suitable source of power.

The material is preferably fed into the highest end of the cylinder through a chute or feed plate 29, and as the same discharges from the opposite end of said cylinder it is deposited preferably onto the discharge chute or plate 30.

The present construction is of the continuous operated type, and it will be apparent that by providing the cylinder with a plurality of grooves or slots 15 and by positioning the pulling means at the outer edge of each of said slots and that by providing means for agitating the fruit, which in the present case is a curvature of the plates 14, the fruit continuously rolls from one slot to another and as the stems of the fruit project through said slots 15 they are engaged by the pulling members and removed from the fruit, which permits the fruit to roll freely toward the discharge end of the cylinder.

Having thus described my invention, what I claim as new and desire to protect by Letters Patent is:—

1. A stemming apparatus including a rotatably mounted fruit receiving drum for receiving and supporting the fruit during the stemming thereof, said drum formed in its wall surface with a plurality of openings through which the stems to be removed are adapted to project on the rotation of said drum, stem engaging means positioned at the outer side of said openings for engaging and removing the stems as projected therethrough from the fruit, means for rotating said stem engaging means a partial revolution in opposite directions during a portion of the rotation of said drum, and means for rotating said drum.

2. A stemming apparatus including a rotatably mounted fruit receiving drum for receiving and supporting the fruit during the stemming thereof, said drum formed in its wall surface with a plurality of longitudinally disposed slots, through which the stems to be removed are adapted to project on the agitation of the fruit within the drum by the rotation thereof, a pair of coacting stem engaging members positioned at the outer side of said drum and coöperating with said slots for engaging the stems as projected therethrough and removing the same from the fruit, means for successively operating said stem engaging means on their arrival at a predetermined position during the rotation of said drum, and means for rotating said drum.

3. A stemming apparatus comprising an inclined, open ended, rotatably mounted drum for receiving and supporting the fruit during the stemming thereof, said drum formed in its wall surface with a plurality of longitudinally disposed slots through which the stems to be removed project on the agitating of the fruit within the drum by the rotation thereof, a pair of coacting stem engaging members positioned at the outer side of said drum and one pair coöperating with each of said slots for engaging the stems and removing the same from the fruit as said stems project through said slots, means for operating said stem engaging means during a partial revolution of said drum, and means for rotating said drum.

4. A stemming apparatus comprising an inclined rotatably mounted fruit receiving and supporting drum formed with a plurality of longitudinally disposed stem receiving grooves in its wall surface, a pair of stem engaging rolls at the outer side of each of said grooves for engaging the stems projecting through the grooves and for separating the same from the fruit as said fruit is supported by the wall surface of said member, means for operating said stem engaging means, whereby the stems projecting through successive grooves are separated from their associated fruit, and means for rotating said drum for agitating the fruit deposited therein to position the unstemmed fruit in coöperation with said grooves and to remove the stemmed fruit from said grooves.

In testimony whereof I have signed my name to this specification in the presence of two subscribing witnesses.

CHARLES E. FORRY.

Witnesses:
HARRY H. TOTTEN,
D. B. RICHARDS.